(12) United States Patent
Gadgil et al.

(10) Patent No.: US 7,058,424 B2
(45) Date of Patent: Jun. 6, 2006

(54) METHOD AND APPARATUS FOR INTERCONNECTING WIRELESS AND WIRELINE NETWORKS

(75) Inventors: Sarang Moreshwar Gadgil, Bangalore (IN); Anand Nagesh Kagalkar, Edison, NJ (US); Sarit Mukherjee, Morganville, NJ (US); Sampath Rangarajan, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 197 days.

(21) Appl. No.: 10/761,060

(22) Filed: Jan. 20, 2004

(65) Prior Publication Data

US 2005/0159181 A1     Jul. 21, 2005

(51) Int. Cl.
*H04Q 7/20*     (2006.01)
(52) U.S. Cl. .................. 455/554.2; 455/554.1; 455/550.1; 455/403; 370/352; 370/235
(58) Field of Classification Search ............... 455/445, 455/552.1, 426.2, 560, 424, 454, 554.2, 403, 455/554.1, 550.1; 709/200, 232; 370/352, 370/389, 392, 232, 235, 395.52; 712/21, 712/221–228, 245; 721/220; 711/169
See application file for complete search history.

(56) References Cited

U.S. PATENT DOCUMENTS

| | | | |
|---|---|---|---|
| 6,574,221 B1 * | 6/2003 | Petersen | 370/395.1 |
| 6,829,697 B1 * | 12/2004 | Davis et al. | 712/21 |
| 2001/0056529 A1 * | 12/2001 | Kamitani | 712/25 |
| 2003/0012198 A1 * | 1/2003 | Kaganoi et al. | 370/392 |
| 2003/0041163 A1 * | 2/2003 | Rhoades et al. | 709/232 |
| 2003/0114153 A1 * | 6/2003 | Shaver et al. | 455/424 |
| 2003/0224782 A1 * | 12/2003 | Dougherty | 455/426.2 |
| 2004/0082352 A1 * | 4/2004 | Keating et al. | 455/519 |
| 2004/0252686 A1 * | 12/2004 | Hooper et al. | 370/389 |
| 2005/0018654 A1 * | 1/2005 | Smith et al. | 370/352 |
| 2005/0036495 A1 * | 2/2005 | Wishneusky et al. | 370/395.4 |
| 2005/0108315 A1 * | 5/2005 | Singh et al. | 709/200 |

* cited by examiner

Primary Examiner—Jean Gelin (57) ABSTRACT

A method and apparatus for interconnecting a wireless network and a wireline network include the division of processing functions between a main processor and a plurality of micro-engines. In accordance with an embodiment of the present invention, respective micro-engines perform the data flow processing of data packets for each of the stages of an interconnection pipeline process and a global main processor performs the control processing of data packets for the interconnection pipeline process.

19 Claims, 10 Drawing Sheets

METHOD AND APPARATUS FOR INTERCONNECTING WIRELESS AND WIRELINE NETWORKS

FIELD OF THE INVENTION

This invention relates to the field of communication networks and, more specifically, to providing a network processor-based gateway for interconnecting wireless and wireline networks.

BACKGROUND OF THE INVENTION

Conventional wireline voice systems, commonly referred to as the Public Switched Telephone Network (PSTN), as well as early wireless systems, such as the Advanced Mobile Phone Services (AMPS) used in the United States, provide a fixed communications path between the message source and the destination. This fixed circuit switching technique establishes a dedicated connection or allocation of system resources, i.e., a radio channel between a base station and mobile terminal, and a dedicated connection between the associated mobile switching center and the PSTN, for the entire duration of the call. Although such dedicated connections are useful in maintaining voice communications, which generally involve the transfer of a continuous stream of voice data which lasts for a relatively long period of time, circuit switching is not very efficient for data communications, particularly wireless data communications, because the short, bursty data transmissions are often followed by lengthy periods of inactivity, resulting in a waste of resources.

With the proliferation of computers, facsimiles, electronic mail (e-mail), short messaging and other services, the transmission of data, particularly in packet form, is becoming more prevalent. In an effort to provide a more efficient network framework for wireline data transmission, the Integrated Services Digital Network (ISDN) was developed to complement the PSTN and provide improved data services between network nodes and end-users.

Several prior art solutions currently exist for interconnecting wireless communications networks and wireline networks. Some of these prior art solutions include computer processor-based gateways. However computer processor-based gateways are slow compared to the parallel processing capabilities of network processor-based gateways. Even further, the addition of multiple CPUs in a computer processor-based gateway to allow for parallel processing Will increase the cost of the gateway substantially.

What is needed is a network processor-based gateway for efficiently and effectively interconnecting wireless and wireline networks.

SUMMARY OF THE INVENTION

The present invention advantageously provides a network processor-based gateway for efficiently and effectively interconnecting wireless and wireline networks.

In one embodiment of the present invention, a network processor-based gateway for interconnecting a wireless network and a wireline network includes a plurality of micro-engines for performing the data flow processing of data packets for the various stages of an interconnection pipeline process for interconnecting the wireless and wireline networks, and a main processor for performing the control processing of data packets for the interconnection pipeline process. Each,of the micro-engines of the gateway of the present invention comprises a dedicated memory for storing instructions for performing the data flow processing of the data packets for respective stages of the pipeline process with which a specific micro-engine is associated. Furthermore, in the network processor-based gateway of the present invention, only the main processor comprises an operating system.

In an alternate embodiment of the present invention a method for interconnecting a wireless network and a wireline network includes performing data flow processing of data packets for the various stages of an interconnection pipeline process using respective dedicated micro-engines for each stage of the pipeline process. Each of the micro-engines includes a dedicated memory for storing instructions for performing the data flow processing of data packets for respective stages of the pipeline process with which each of the micro-engines is associated. The method further includes performing the control processing of data packets for the pipeline process using a global main processor.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although the concepts of the present invention are described herein with respect to a network router performing specific pipeline processes for the interconnection of wireless and wireline networks, it should be noted that the network router is simply provided as an exemplary working environment for specific embodiments of the present invention and should not be treated as limiting the scope of the invention. It will be appreciated by those skilled in the art informed by the teachings of the present invention that the concepts of the present invention may be applied in substantially any network processor-based gateway performing substantially any known processes used for interconnecting communication networks.

Figure 1:
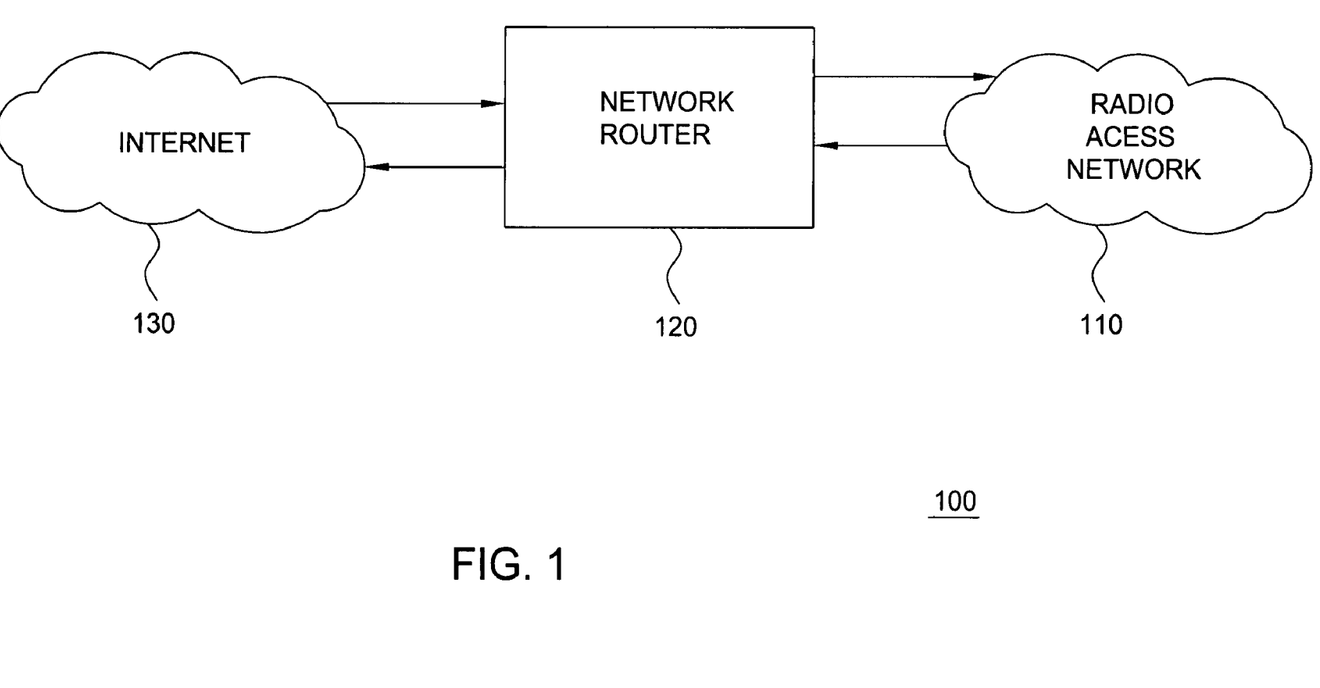
FIG. 1 depicts a high level block diagram of a communication system including an embodiment of a network processor-based gateway in accordance with the present invention.

FIG. 1 depicts a high level block diagram of a communication system illustrating the communication between a wireless network (illustratively a radio access network) and a wireline network (illustratively a Public Data Network (e.g., the Internet)). The communication system 100 of FIG. 1 comprises a radio access network 110 and an Internet 130. The two networks are illustratively interconnected by a network processor-based gateway (illustratively a network router) 120 in accordance with an embodiment of the present invention. In the communication system 100 of FIG. 1, data from the radio access network 110 intended for the Internet 130 is communicated to the Internet 130 via the network router 120 and similarly, data from the Internet 130 intended for the radio access network 110 is communicated to the radio access network 110 via the network router 120.

The interconnection of a wireless and a wireline network typically includes several stages of a pipeline packet process. These stages may include but are not limited to Ingress Handler, Ether Input, IP Input, Packet Forwarder, and Output Link Scheduler. The Ingress handler allocates memory for an incoming packet, does any reassembly, determines the packet size, incoming port and allocates necessary packet processing data structures like packet record. Each stage operates on a different header of a packet being processed and extracts information to be recorded into a packet record for processing in a next stage. The data packet headers are processed in the sequential order of the stages of the pipeline process.

Figure 2:
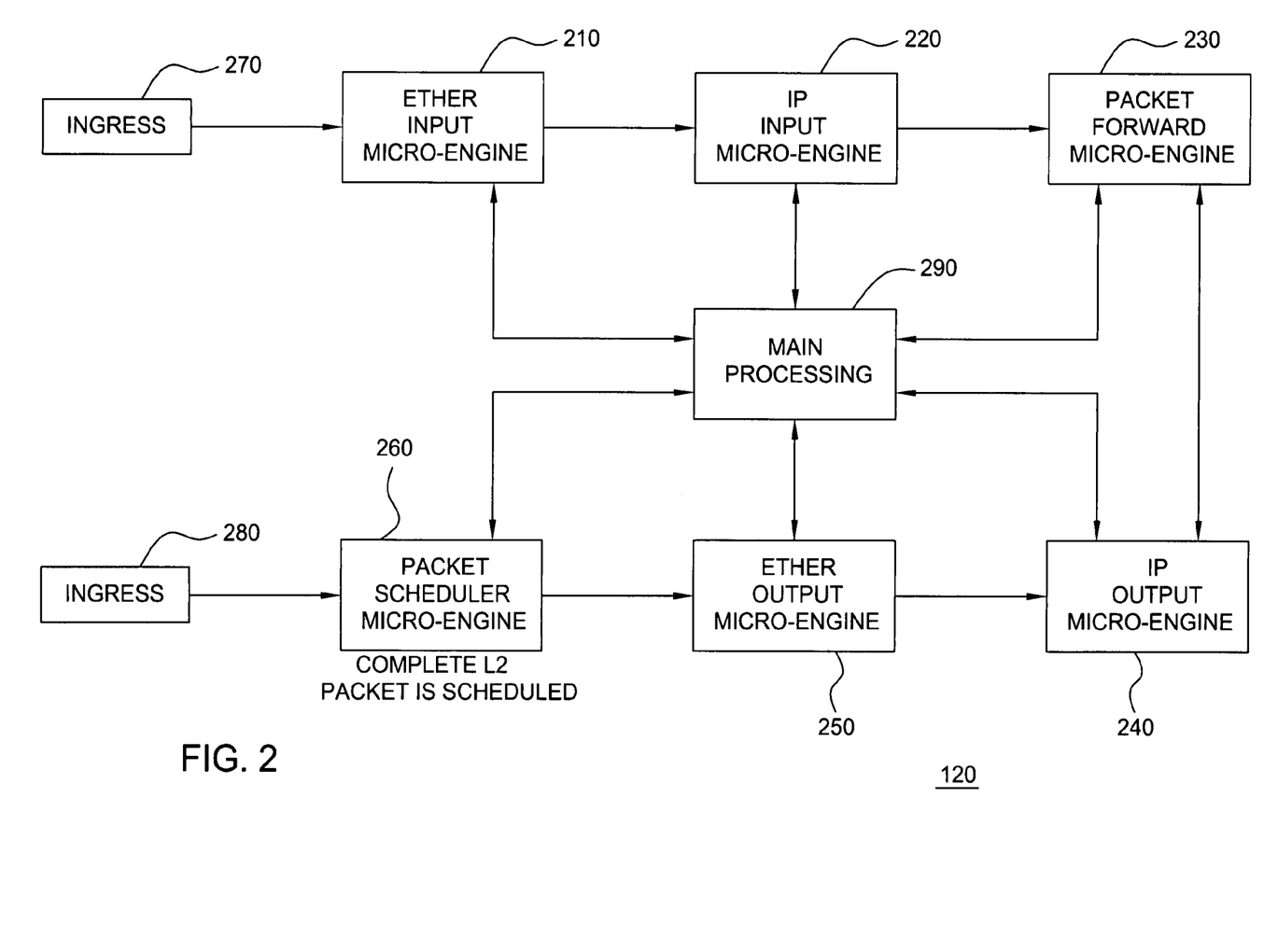
FIG. 2 depicts a high level flow diagram of an embodiment of the internal pipeline processes of an interconnection procedure for the network router of FIG. 1.

The inventors propose herein an inventive network processor-based gateway and method for performing the processes (stages) of an interconnection pipeline process for providing an efficient and effective means for interconnecting a wireless network and a wireline network. For example, FIG. 2 depicts a high level flow diagram of an embodiment of the various stages of an interconnection pipeline process to be performed by the network router 120 of FIG. 1 for efficiently and effectively interconnecting a wireless network and a wireline network in accordance with the present invention. The interconnection pipeline process of the network router 120 of FIG. 2 illustratively comprises an Ether input process 210, an IP input process 220, a Packet forward process 230, an IP output process 240, an Ether output process 250, and a Packet Scheduler process 260. The Ingress 270 illustrated in FIG. 2 depicts an ingress point (i.e., point of entry) for the input of data from either the radio access network 110 intended for the Internet 130 or from the Internet 130 intended for the radio access network 110. Similarly, the Egress 280 depicts an output point for the output of data from the network router 120 intended for either the Internet 130 or the radio access network 110.

In the embodiment of the network processor-based gateway (e.g., the network router 120) of FIG. 2, each of the illustrated process blocks (stages) is representative of and performed by an individual micro-engine. Although the various stages of the pipeline process for processing a data packet need to be performed in the specific order shown in FIG. 2 for each of the data packets received, the network router 120 of the present invention is capable of performing parallel processing of different data packets in the various stages of the pipeline process via the micro-engines.

More specifically, a network processor-based gateway (e.g., the network router 120) in accordance with an embodiment of the present invention is comprised of a plurality of micro-engines and a main processor 290 as depicted in FIG. 2. The various processes for the transmission of a packet between a wireless network and a wireline network are divided between the main processor 290 and the micro-engines. For example, each of the micro-engines of the network router 120 is adapted to perform substantially only the data flow processes of a specific stage of the pipeline process to which it is assigned. That is, the data flow portion of the data packet processing pipeline is performed by respective ones of the micro-engines of the network router 120 with data packets not capable of being processed within a respective micro-engine being forwarded to the main processor 290. The main processor, upon receiving a data packet, performs various functional processes on the data packets (i.e., control processes) and then returns the packet to a subsequent stage of the pipeline process and, as such, to subsequent micro-engines for further processing of the remaining stages of the pipeline. Such an instance where a micro-engine is not capable of processing a data packet and forwards it to the main processor 290, is considered as an exception by the inventors.

Although in the embodiment of FIG. 2, the network processor-based gateway (e.g., the network router 120) is depicted as comprising a single micro-engine for each of the stages of a pipeline process, in alternate embodiments of the present invention a single processing stage may be performed by more than one micro-engine or alternatively several processing stages may be performed by a single micro-engine. More specifically, in accordance with the concepts of the present invention, the processing stages and the micro-engines for performing the respective processes of the stages may be implemented in substantially any combination depending on the amount of memory and other resources required for processing each of the stages.

Figure 3:
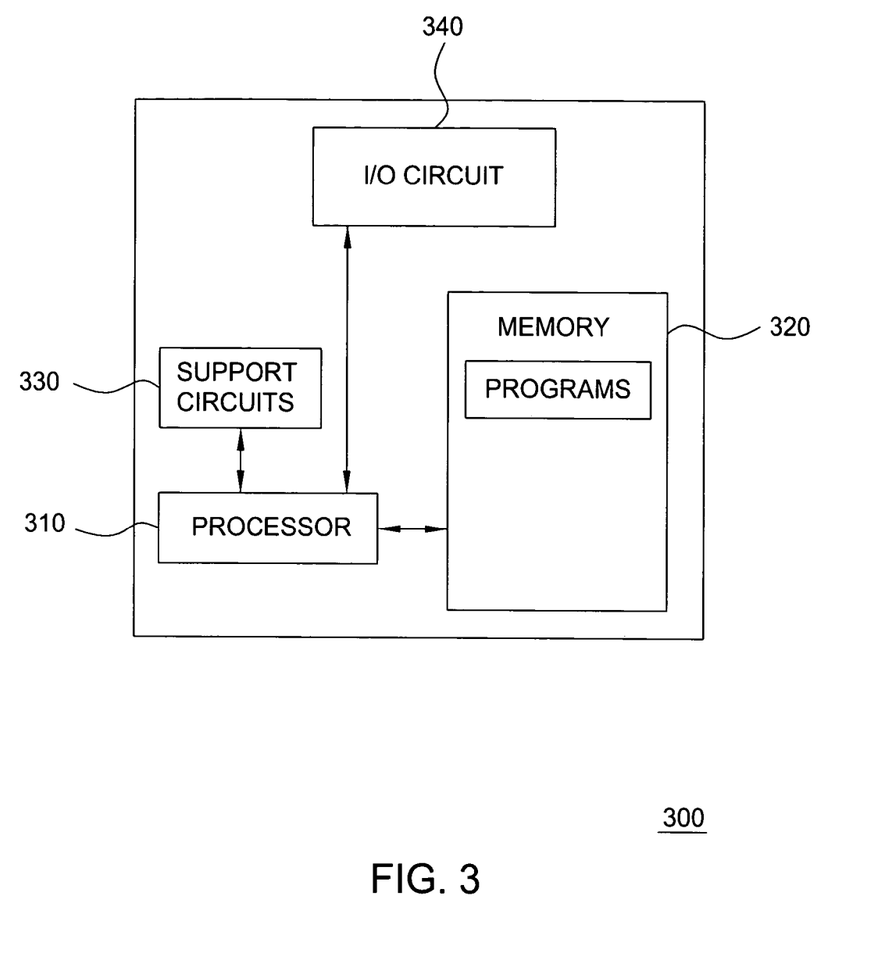
FIG. 3 depicts a high level block diagram of an embodiment of the micro-engines of the present invention.

FIG. 3 depicts a high level block diagram of an embodiment of the micro-engines of the present invention. Each of the micro-engines of the present invention comprises substantially similar form and performs related functions for respective stages of a pipeline process, and as such, the micro-engine depicted in FIG. 3 is to be considered representative of an embodiment of any and all of the micro-engines of the present invention. The micro-engine 300 of FIG. 3 comprises a processor 310 as well as a memory 320 for storing information such as control programs and instructions for performing the processes associated with a particular stage of the pipeline processes to which a specific micro-engine is assigned. The processor 310 of the micro-engine 300 cooperates with conventional support circuitry 330 such as power supplies, clock circuits, cache memory and the like as well as circuits that assist in executing the software routines and instructions stored in the memory 320. As such, it is contemplated that some of the process steps discussed herein as software processes may be implemented within hardware, for example, as circuitry that cooperates with the processor 310 to perform various steps. The processor 300 also contains input-output circuitry 340 that forms an interface between the various functional elements communicating with the processor 300.

As depicted in FIG. 3, each of the micro-engines of the present invention includes a dedicated memory. As such, each of the micro-engines of the present invention is capable of performing specific tasks without negatively effecting the execution of the tasks performed by other micro-engines associated with other stages and without having to access the main processor. More specifically, each of the micro-engines of the present invention includes a memory for storing instructions for performing the processes associated with a stage of the pipeline process for the interconnection of the wireless network and the wireline network with which the specific micro-engine is associated (i.e., each of the micro-engines may be programmed to perform specific tasks without hampering the execution of the tasks performed by other micro-engines).

The dedicated memory enables the fast retrieval and execution of the process-specific instructions by the micro-engines of the present invention. In addition, the micro-engines do not need to contain an operating system because the micro-engines simply perform the programmed instructions. That is, in each of the stages of the pipeline process for the interconnection of the wireless network and the wireline network, the micro-engine(s) performing the specified processes of a stage examines a received packet and determines (i.e., via a packet header) if the packet is able to be processed. If the packet is such that it is capable of being processed by the micro-engine associated with the current stage, the micro-engine processes the packet and forwards the packet to the next stage (i.e., and to a subsequent micro-engine). If a received packet is not capable of being processed in the micro-engine, the packet is forwarded to a main processor for processing. As such, the operating system is instead located within a memory of the main processor.

The main processor of the present invention in various embodiments comprises substantially the same physical structure as the micro-engines 300 of FIG. 3. That is, the main processor of the present invention comprises a processor as well as a memory for storing information such as control programs and instructions for performing at least control processes for the packets forwarded to the main processor by the micro-engines. The processor of the main processor cooperates with conventional support circuitry such as power supplies, clock circuits, cache memory and the like as well as circuits that assist in executing the software routines and instructions stored in the memory. For example, when a data packet not able to be processed by one of the micro-engines is forwarded to the main processor, the main processor performs various processes on the packet to configure the packet such that it is capable of being processed by the micro-engines (i.e., the main processor performs any control processes necessary) and then returns the packet to the pipeline and, as such, to subsequent micro-engines for further processing (i.e., data flow processing) of the remaining stages of the pipeline. Such processes performed by the main processor are well-known in the art and as such will not be described in detail herein.

Once a data packet is processed by the main processor, the main processor forwards the processed packet to a data queue to be further processed by the micro-engines in a next stage of the pipeline process for the interconnection of the wireless and wireline networks. Briefly stated, the main processor of the present invention performs the control processing of the pipeline process for interconnecting a wireless network to a wireline network while the micro-engines perform the processes necessary to achieve data flow. An example of a control process performed by the main processor of the present invention may be, if a micro-engine cannot completely process a data packet because the particular micro-engine does not recognize the data packet (i.e., it doesn't know where a packet has come from or for where the packet is destined), the data packet is forwarded to the main processor for processing.

Figure 4:
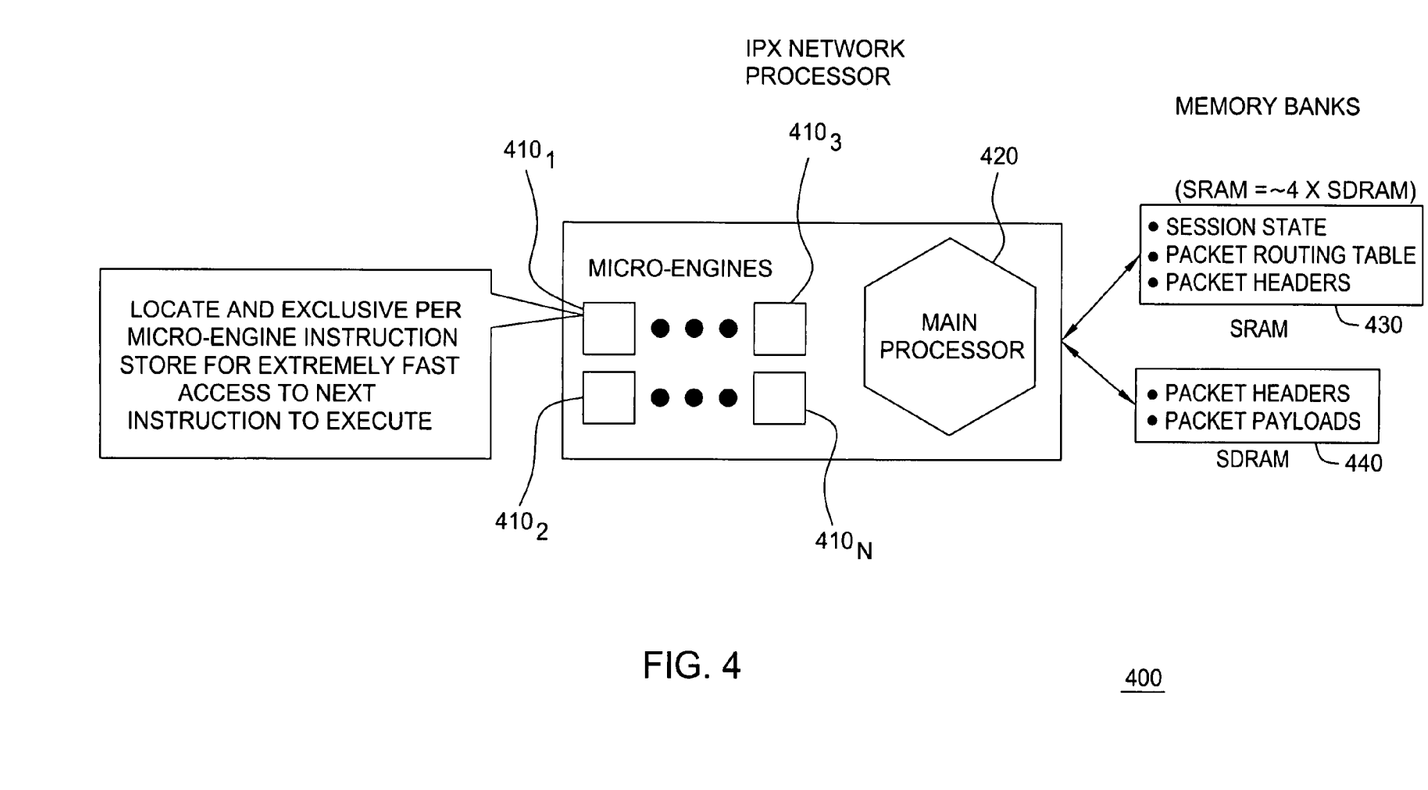
FIG. 4 depicts a high level diagram of an embodiment of a network processor-based gateway of the present invention having a shared memory.

In addition to the dedicated memories in the main processor and in each of the micro-engines, in various embodiments of a network processor-based gateway of the present invention, the micro-engines and the main processor also share a memory. For example, FIG. 4 depicts a high level diagram of an embodiment of a network processor-based gateway in accordance with the present invention comprising a shared memory. The network processor-based gateway 400 of FIG. 4 comprises a plurality of micro-engines $410_1$–$410_N$, a main processor 420, a fast SRAM memory bank 430 and an SDRAM memory bank 440.

The fast SRAM memory bank 430 of the network processor-based gateway 400 is used for storing active sessions and other key data structures and tables, such as the Packet Routing Table. The SDRAM memory bank 440 is used for storing inactive always-on session overflow from the SRAM and packet payload. The division of the shared SRAM memory bank 430 and the SDRAM memory bank 440 into multi-level hierarchy enables the network processor-based gateway 400 to store and support a large number of always-on sessions.

The inventors describe herein several stages of the interconnection pipeline process described above that are processed by respective micro-engines. For example, in the embodiment of the network processor-based gateway of the present invention depicted in FIG. 2, input packets are received at the Ingress 270 and subsequently processed by one of the micro-engines. Briefly stated, each of the micro-engines of the present invention examines a received packet to determine if that packet is able to be processed within that particular micro-engine. If the packet is suitable for processing the packet is processed by the micro-engine. If the micro-engine cannot process the packet then the packet may be marked, for example as an 'exception', and sent to the main processor 290 for processing. The main processor 290 performs various operational functions on the data packet from the particular micro-engine to condition the packet such that the packet and other such packets (i.e., the packets of a session) are able to be processed by the micro-engines of the network router 120 of the present invention.

Alternatively, if a micro-engine determines, for example via a MAC address, that a packet is not intended for processing by the network processor-based gateway (e.g., the network router 120) then the packet is dropped. The micro-engines of the present invention determine the status of each of the packets from information contained in the packet header. Each micro-engine of the present invention in each stage of the processing of the present invention processes, for example, a different part of the packet header after which, that part of the header is ignored or removed.

Figure 5:
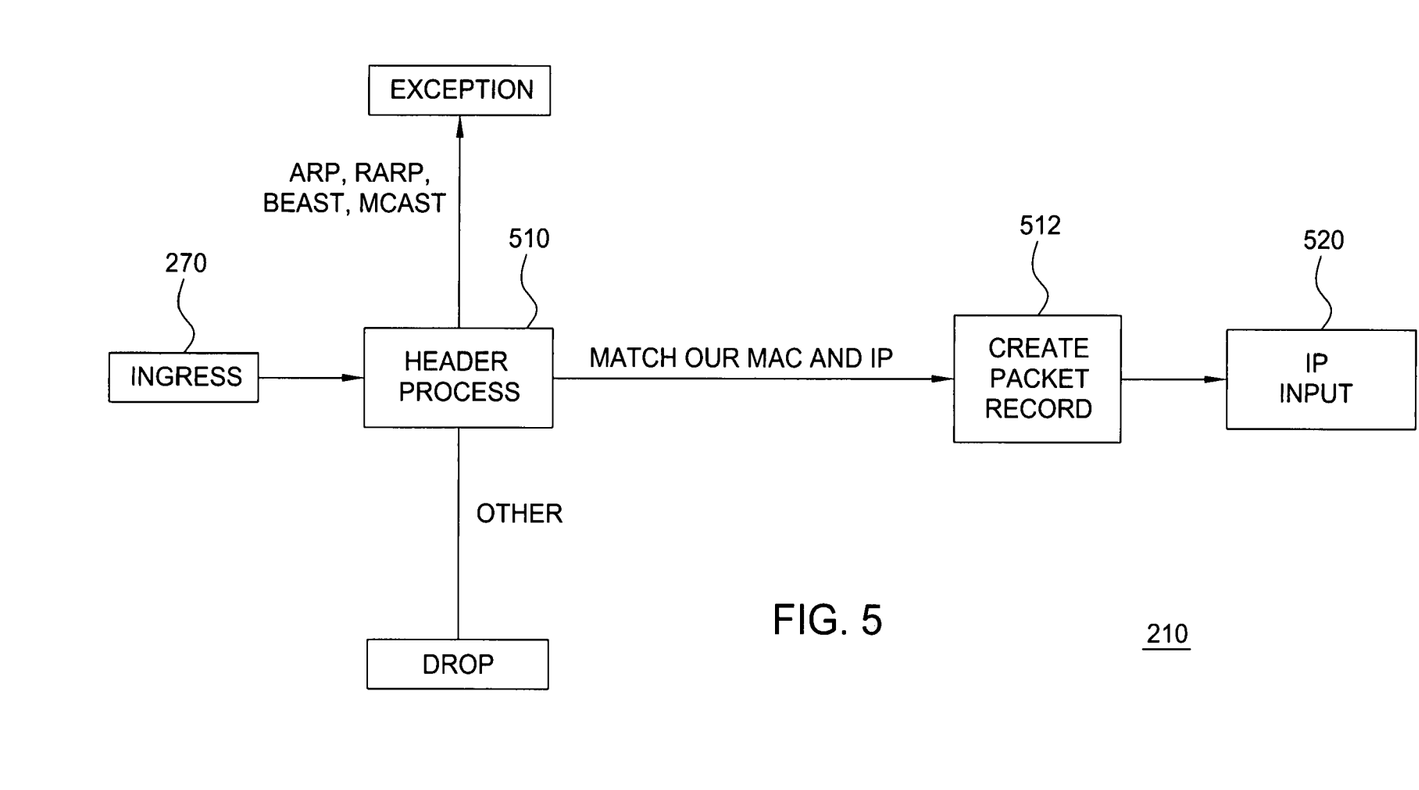
FIG. 5 depicts a high level flow diagram of an embodiment of the Ether input process of FIG. 2.

FIG. 5 depicts a high level flow diagram of an embodiment of the Ether input process 210 of FIG. 2 being performed by an Ethernet input micro-engine(s). Briefly stated, data is coupled to the network router 120 via the Ingress 270 after which the Ether input process 210 is performed. During the Ether input process 210 packets that are not destined for the network router 120 are filtered out at step 510. That is, the Ethernet input micro-engine performing the Ether input process 510 processes the header of the Ethernet frame and drops all packets not intended for the network router 120. All ARP, Broadcast and Multicast packets are marked as 'exceptions' because they are not able to be processed by the Ethernet input micro-engine and as such, these packets are forwarded to the main processor (not shown. Valid packets (i.e., those intended for the network router 120) are processed by the Ether input process micro-engine 210.

During the Ether input process 210, a Packet Record is created for the valid packets at step 512. The Packet Record contains useful information about the packet and processes performed on the particular packet. More specifically, it is often necessary for the micro-engine of a subsequent process to know specific information as to what processes were performed on a packet in a previous stage. As such, the Packet Record is created in a memory accessible to all of the micro-engines and the main processor (e.g., the shared SRAM or SDRAM memory). Upon the creation of the Packet Record, the processed portion of the packet header is, in one embodiment, removed. A Packet Record in accordance with the present invention may comprise of such information as follows:

1. Packet Buffer Pointer—Indicates where in a memory the packet resides
2. Packet Size
3. Ingress Port
4. Flow Identifier—Identifies to which flow the packet belongs
5. Policer Index—Index to retrieve any policing information.
6. Priority—Priority of the packet
7. TOS—Type of Service
8. Parameter Area—Space for additional parameters.

The created Packet Record remains in the shared memory until a data packet is finished being processed and is sent out of the network processor-based gateway (e.g., the network router 120). Once the Packet Record has been successfully created, the Ethernet header is removed from the data packet and the packet is forwarded to, for example in FIG. 2, the IP input process 220.

Figure 6:
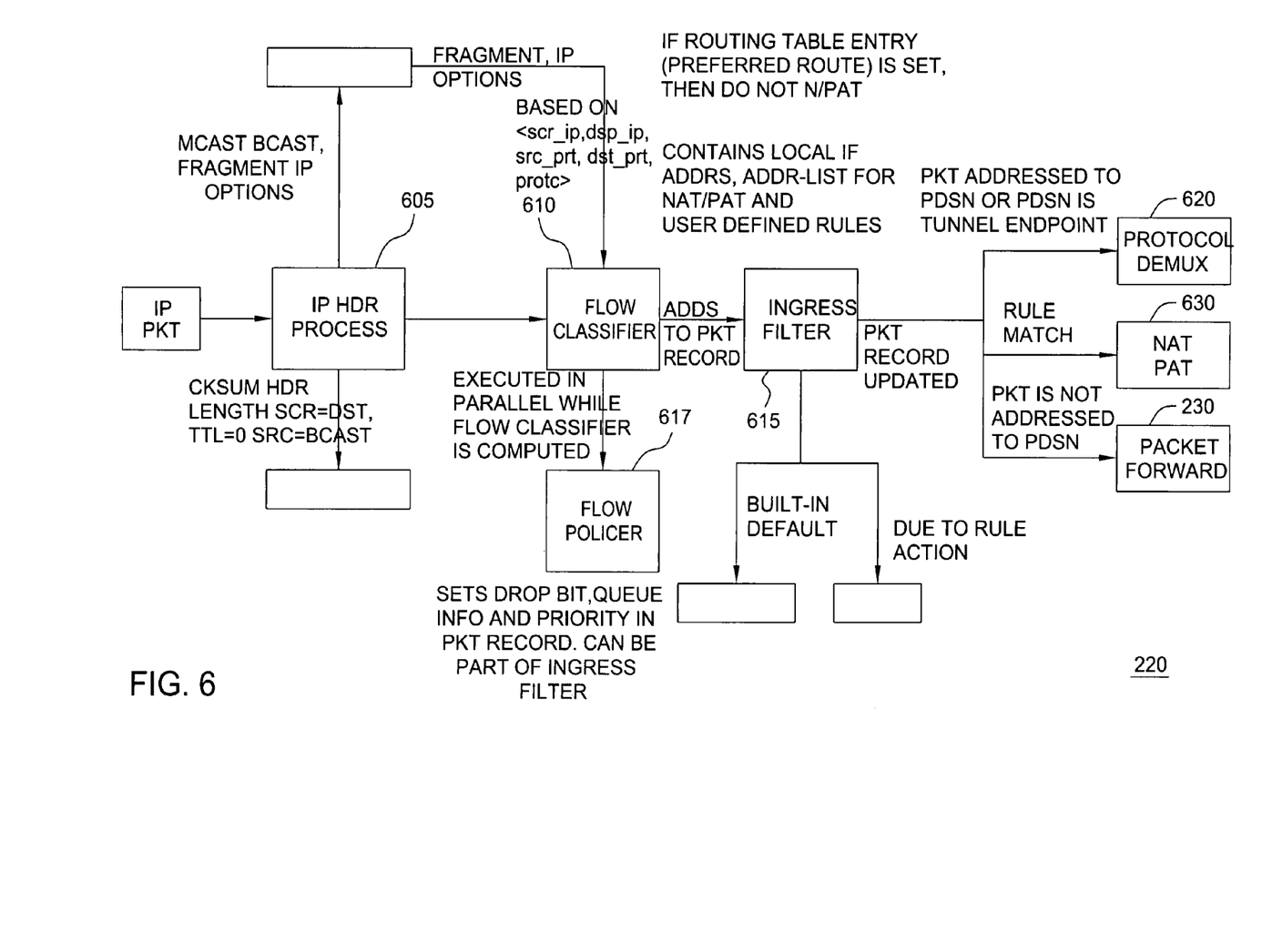
FIG. 6 depicts a high level flow diagram of an embodiment of the IP input process of FIG. 2.

FIG. 6 depicts a high level flow diagram of an embodiment of the IP input process 220 of FIG. 2. During the IP input process 220 the correctness of an IP packet is verified in step 605. That is, during the IP input process 220 a micro-engine(s) performing the IP input process determines if a received packet is able to be processed. Multicast, broadcast, IP options and reassembly of IP fragments are not processed by the IP input process micro-engine 220. Packets of these categories are marked as 'exceptions' and are forwarded to the main processor (not shown). At step 610, a flow id is assigned to the packet based on five tuple as is known to a person of ordinary skill in the art. The flow id is added to the Packet Record so that any later stage (i.e., micro-engine) can access the flow id information. One exemplary use of the flow id assigned to the IP packet is to perform Ingress packet filtering of the IP packet, depicted as step 615 in FIG. 4.

The Ingress packet filtering process of step 615 contains rules for processing a packet. For example, and as illustrated in FIG. 6, if a Mobile IP's (MIP) packet address overlaps with the private address allocated by a packet data serving node (PDSN), then the preferred route is set to a Protocol Demultiplexer process 620. This makes sure that the MIP in this case is not communicated to the network address translator/port address translator (NAT/PAT) process 630. Other rules exist for the Ingress packet filtering of step 615 for communicating data packets to the Protocol Demultiplexer process 620, the NAT/PAT process 630, and the Packet forward process 230 of FIG. 2. Briefly stated, the rules for Ingress packet filtering of step 615 are exemplary of the rules in the other stages performed by other stage micro-engines and involve determining whether a packet should be processed by the IP input micro-engine, forwarded to the main processor or dropped. At step 617, a flow policer makes sure that a particular flow does not violate the bandwidth requirements. The Ingress packet filtering of the present invention also allows for the input of user defined rules for the filtering or modification of the packets according to the user defined rules.

Figure 7:
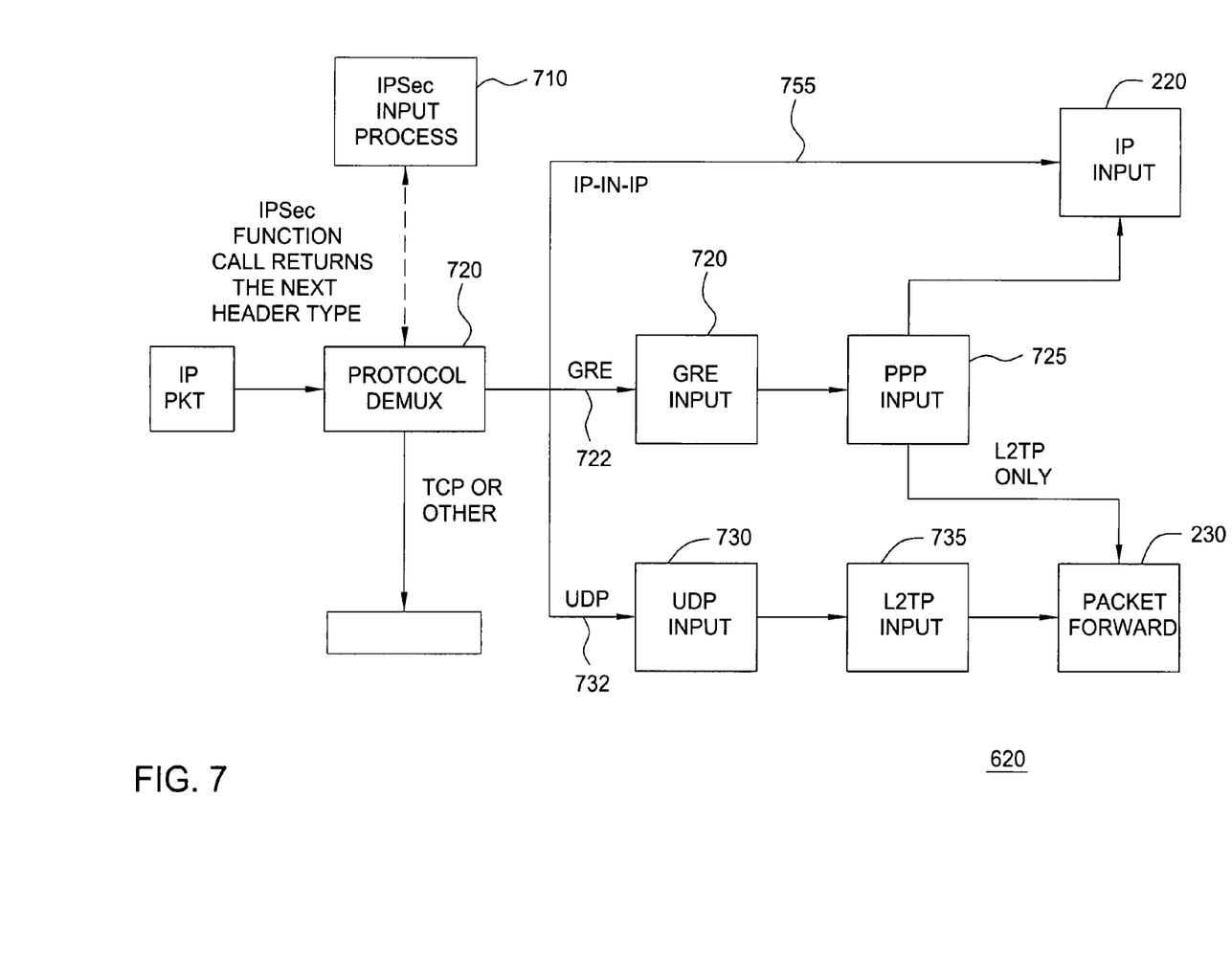
FIG. 7 depicts a high level flow diagram of an embodiment of the Protocol Demultiplexer process of FIG. 6.

FIG. 7 depicts a high level flow diagram of an embodiment of the Protocol Demultiplexer process 620 of the IP input process 220 illustrated in FIG. 6. The Protocol Demultiplexer process micro-engine 620 processes only IP-in-IP, Generic routing encapsulation (GRE) tunnels, L2TP tunnels, and IP security (IPSec) protocol data. TCP or other packets are forwarded to the main processor. As illustrated in FIG. 7, the Protocol Demultiplexer process micro-engine 620 determines the type of input packet and routes the received input packet to first an IPsec process 710, and then to either a GRE input process 720, a user datagram protocol (UDP) input process 730, or back to the start of the IP input process 220. For example, upon receiving a data packet, the Protocol Demultiplexer process micro-engine 620 communicates the data packet to the IPsec process 510.

The IPsec process 710 is implemented by a micro-engine in parallel to the packet processing of the invention. Specifically, a sanity check is performed on the IPSec header of a data packet. If the sanity check fails, the data packet is dropped.

Additionally, a Security Association (SA) table is looked up for session information. If the table look-up fails, the data packet is dropped. If an SA entry is found, the SA entry is forwarded to an external unit for decryption. The decrypted packet is then returned to the Protocol Demultiplexer process micro-engine 620 (the caller). That is, the IPsec process 710 is a function call as opposed to a new stage. This means that the process, after processing the data packet, returns to the calling entity (i.e., the Protocol Demultiplexer process micro-engine 620).

Referring back to FIG. 7, the data packet may then be forwarded to one of illustratively three protocol paths, an IP-in-IP path 755, a GRE path 722 or a UDP path 732. In the IP-in-IP path 755, a data packet is routed back to the IP input process 220.

In the UDP path 732, a data packet is first communicated to the UDP input process 730 wherein a UDP input process micro-engine 730 processes UDP packets belonging to the ports that are registered for L2TP. The UDP packets are then forwarded to a L2TP input process 735. All other UDP packets are communicated as exceptions to a main processor (not shown). The UDP process is then performed as known in the art except that the UDP input process of the present invention is performed by a micro-engine. For example, in the UDP input process 730 the UDP header sanity is verified. If the sanity check fails, the data packet is dropped. Subsequently, a UDP session is looked up and verified using the four-tuple information present in the packet header. If a session cannot be found, the packet will be marked as an 'exception' and forwarded to the main processor for further processing. If session information is found, then the session is forwarded to the L2TP input process 735.

In the L2TP input process 735, a L2TP micro-engine forwards L2TP control packets to the main processor for processing. Subsequently, a sequence number check function is performed to check for holes in the sequence. The Packet Record is then updated with forwarding information (e.g., Preferred Route) received from the L2TP session record. An L2TP payload queue is maintained for ordering any out of sequence data packets. The in sequence data packets of the L2TP input process 735 are then sent to the Packet forward process 230.

Referring back to FIG. 7, in the GRE path 722, a data packet is communicated to the GRE input process 720. A GRE micro-engine then performs the GRE input process. Briefly stated, in the GRE input process 720, the protocol of received packets are examined to ensure that the received packets are of supported GRE packet types, IP and PPP. Any packets of other types are discarded. The GRE micro-engine thus performs a Session lookup process. In the Session lookup process, the GRE micro-engine verifies that the GRE session was setup by the main processor. More specifically, in order for the micro-engine 720 to support a GRE session, the main processor (not shown) must first set the session up through R-P negotiation. That is, when the micro-engine 720 determines that a GRE packet has been received by the network router 120, a corresponding session number should already be authorized by the main processor and be set in a GRE Session Record in the main processor that the GRE micro-engine can access. The Packet Record should be updated to indicate the GRE session record. If such a session does not exist, the received GRE packet is discarded. This enables all the protocol processing (except for Ethernet) to be processed by the main processor because the GRE packets may be forwarded to the main processor. If the network router 120 is performing P-P tunneling, then the GRE payload should be tunneled to another network processor-based gateway using GRE tunneling. The GRE Session Record maintained in the main processor has a Route Index setup for indicating such special processing.

Next, packet reordering is performed based on a GRE sequence number. Note that there is no retransmission of a lost packet by a sender. The network router 120 simply waits for a predetermined timeout period for the lost packet to arrive. If the lost packet does not arrive, the packets are reordered. The GRE payload is then queued per session so that HDLC deframing is performed on per GRE session. Irrespective of whether a packet is Byte Stream or PPP, the packet is queued. If there is a hole in the GRE sequence space, then some PPP frames are lost. The hole in the GRE sequence may be detected by a GRE sequence number. However, in order to expedite the process, the presence of the hole is indicated (i.e., if packet i is lost, the hole is flagged in packet record i+1) in the Packet Record of the main processor. In such a case the entire HDLC processing and FCS computation can be avoided altogether, and the incomplete PPP frame may be dropped.

Referring back to FIG. 7, after the completion of the GRE input process 720, the data packet is then communicated to the PPP input process 725. In the PPP input process 725, if the session is L2TPed to a remote LNS and the PDSN is acting as a LAC, a PPP input process micro-engine forwards the PPP frame using L2TP to the Packet forward process 230 depicted in FIG. 2. Otherwise, the IP packet within the PPP frame is routed back to the IP input process 220.

The stages of a pipeline for processing a received data packet described herein may be performed substantially in the same manner as similar processes currently known to those skilled in the art or future developed processes, with the exception that in a network processor-based gateway (e.g., the network router 120) in accordance with the present invention, the stages of the pipeline are performed by specific micro-engines adapted to perform the processes of the particular stage to which they are assigned. In addition, a network processor-based gateway of the present invention comprises a main processor for performing various aspects of the packet processing that cannot be performed by the micro-engines. Such instances are indicated as exceptions by the various micro-engines and are forwarded to the main processor for processing.

Figure 8:
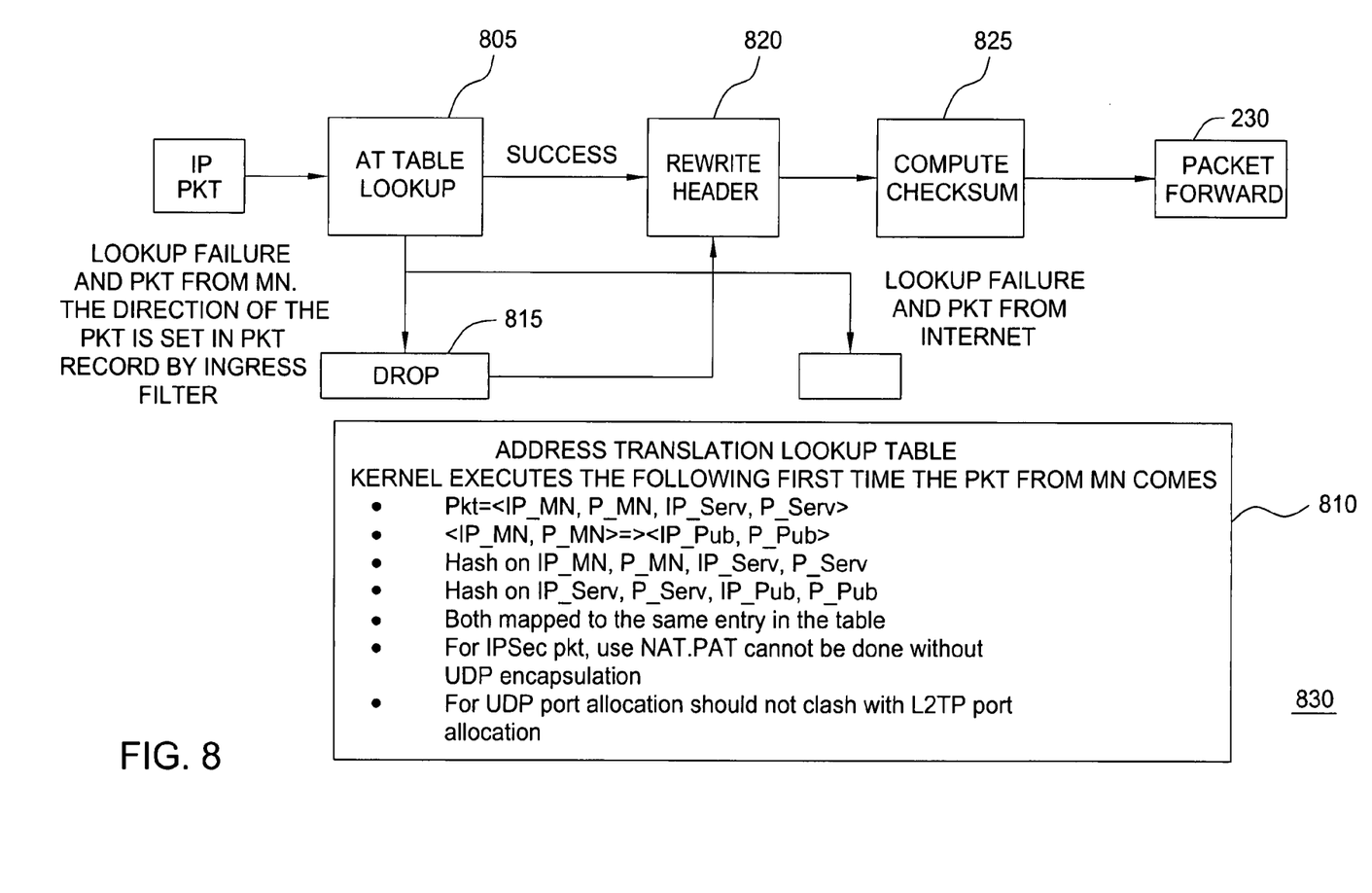
FIG. 8 depicts a high level flow diagram of an embodiment of the NAT/PAT process of FIG. 6.

For example, FIG. 8 depicts a high level flow diagram of an embodiment of the NAT/PAT process 630 of FIG. 6. When an IP data packet enters the NAT/PAT process 630, the address of the data packet is looked up in an AT Lookup Table at step 805. It should be noted however, that initially when a data packet is processed by the NAT/PAT process 630, the AT Lookup Table may not be setup. That is, the first lookup fails when a data packet first comes to the network router 120. As previously described, the direction of the data packet is written by the Ingress packet filtering process 640 into the corresponding Packet Record. In this scenario, a NAT/PAT association has to be formed (as illustrated by step 810 of FIG. 8) by the main processor. However, if the AT Lookup Table is setup and the AT Lookup Table process of step 805 fails, the data packet is dropped as illustrated by step 815 in FIG. 8. In the AT Lookup Table process of step 805 if the data packet being processed is received from the wireless network 110, the Lookup Table process of step 805 is based on a source IP and a source port. However if a data packet being process is received from the wireline network 130, the Lookup Table process is based on a destination IP and a destination port.

Upon the successful completion of the AT Lookup Table process of step 805, the NAT/PAT process 630 proceeds to a Rewrite Header process in step 820. In the Rewrite Header process of step 820, the IP header is written. The address and port used for rewriting the header of the IP data packet is found in the Packet Record. Note however that if the main processor sets up the association in the Address Translation table, then it sends the data packet to Rewrite Header process of step 820 after updating the Packet Record with the addresses to use for rewriting the header of the IP data packet.

The NAT/PAT process 630 then proceeds to a Compute checksum process at step 625. During the Compute checksum process of step 825, the IP header checksum is recomputed using known techniques and as such will not be described in detail herein. After the checksum of the IP header of the data packet is recomputed at step 825, the NAT/PAT process 630 proceeds to the Packet forward process 230 depicted in FIG. 2.

Figure 9:
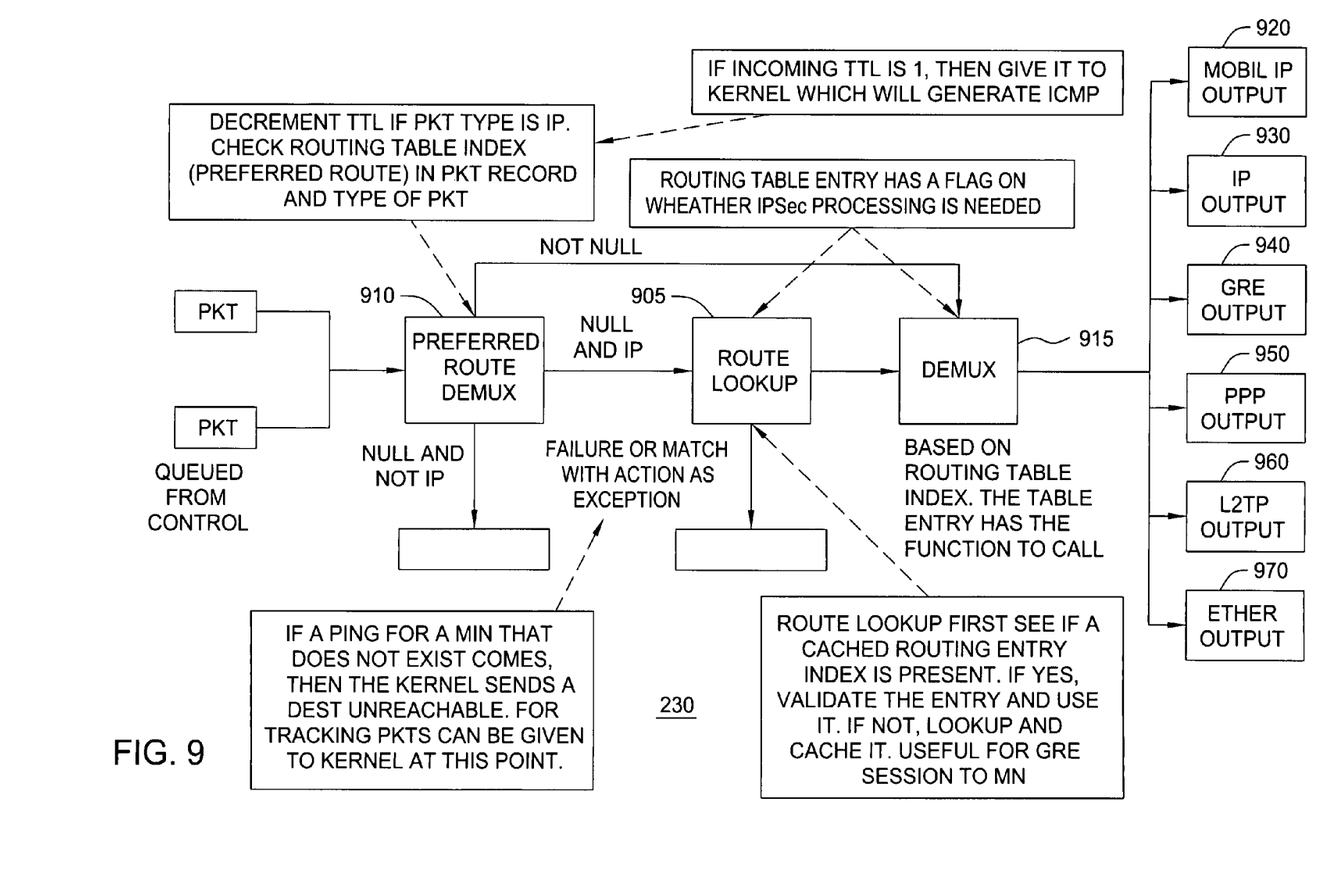
FIG. 9 depicts a high level flow diagram of an embodiment of the Packet forward process of FIG. 2.

To further illustrate the interaction between the main processor and the micro-engines of the present invention, FIG. 9 depicts a high level flow diagram of an embodiment of the Packet forward process 230 of FIG. 2. Any packet outgoing from the network router 120 is processed by the Packet forward process 230. The Packet forward process 230 is capable of processing IP packets as well as non IP packets. It processes packets from a previous stage as well as those generated by the main processor. The packets generated by the main processor have higher priority over those coming from the previous stage. As depicted in FIG. 9, for the case of IP packets, the Packet forward process 230 either looks up the outgoing route at step 905, or uses the preferred route set in the Packet record at step 910. If a route cannot be found for any reason, the packet will be dropped at this stage. If a lookup is performed and a route is found, then the route can be cached in a memory region. Where the route needs to be cached can be determined by a field set in the Packet Record. In addition, for IP packets the time to live (TTL) of the IP packets coming from another network element is decremented, and if zero, the packet is forwarded to the main processor. A non zero-resulting TTL causes the packet to be forwarded. For the case of non-IP packets, there has to be a preferred route set in the Packet record and found at step 910, otherwise the Packet forward process 230 drops the packet.

Once a decision to forward the packet has been made, the data packet is demultiplexed at step 915 wherein an output function arranged as a table entry is used to determine which output process to call. More specifically, in the Packet forward process 230 of FIG. 9 a table entry in the data packet is used to determine to which of the illustratively six output processes (e.g., Mobil IP output 920, IP output 240, GRE output 940, PPP output 950, L2TP output 960, and Ether output 250) the data packet will be routed.

Figure 10:
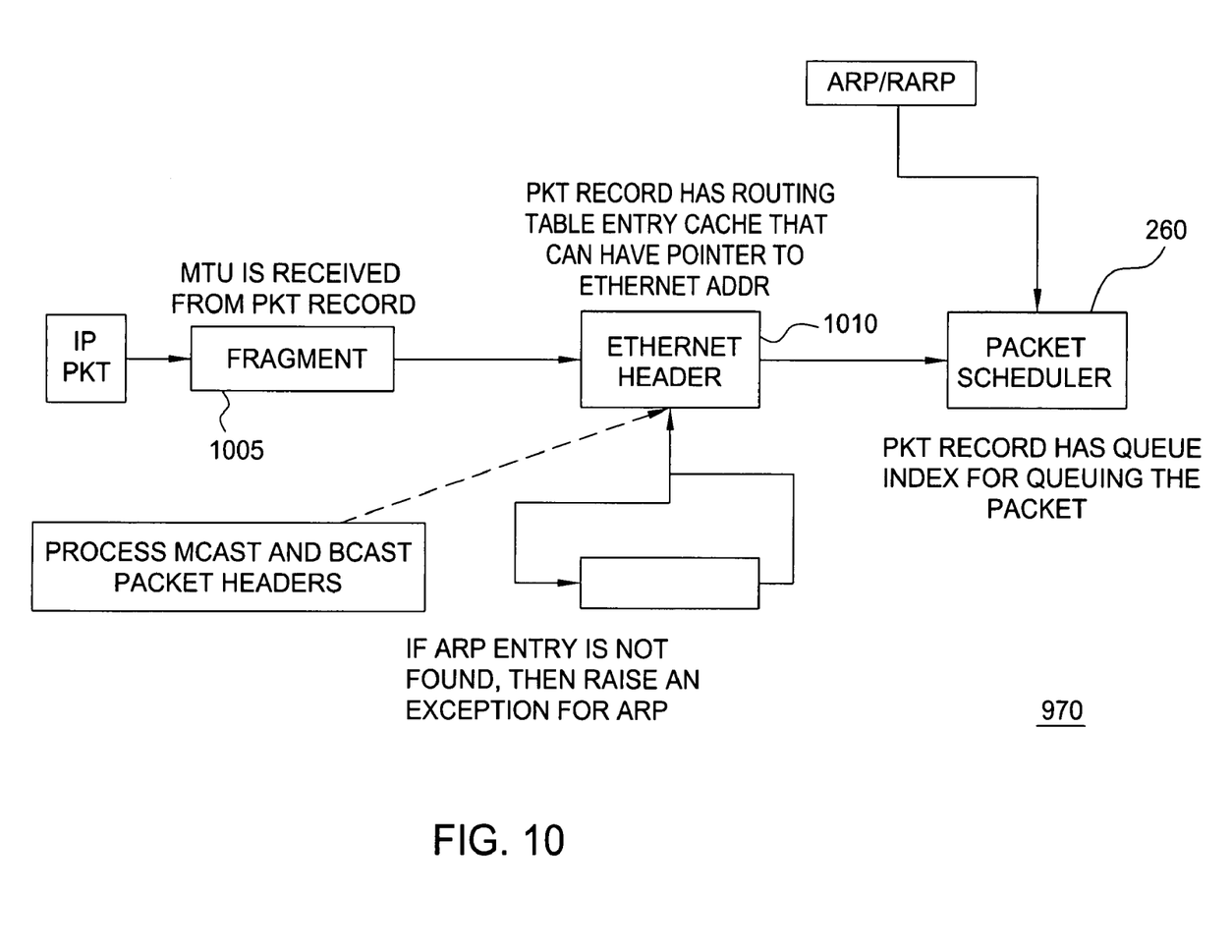
FIG. 10 depicts a high level flow diagram of an embodiment of the Ether output process of FIG. 9.

To briefly illustrate and describe an output process of the present invention, FIG. 10 depicts a high level flow diagram of an embodiment of the Ether output process 250 of FIG. 2 and FIG. 9. In the Ether output process 250, IP fragmentation is performed at step 1005. At step 1010, next hop IP address information from the Packet record and an ARP table lookup are used to find the destination Ethernet address. If no ARP table entry is found, then the packet is forwarded to the main processor as an exception. If an ARP table entry is found then an Ethernet header is pre-pended to the existing packet and queued within the Packet scheduler process 260.

The present invention provides several advantages over prior art gateways in that a gateway in accordance with the present invention comprises at least an inventive hierarchical structure including a plurality of micro-engines and a single main processor. The micro-engines of the present invention are each (or in some embodiments, as described above, one micro-engine may perform more that one stage process or alternatively more than one micro-engine may be assigned to one stage process) adapted to performing a specific process function of a respective stage of an interconnection pipeline without having to be informed of what processes of what stages of a pipeline other micro-engines are performing. Each of the micro-engines simply performs its own function or stage of the pipeline process and forwards the processed packet to a next micro-engine, if any. If a micro-engine does not recognize a data packet, it instead forwards the data packet to the main processor. Each of the micro-engines may be operating in parallel on different data packets thus accomplishing a fast and efficient interconnection of communication networks.

Furthermore, the main processor of the present invention is the only processor that requires an operating system. Specifically, the main processor of the present invention performs substantially all of the control processing of data packets and as such is the only processor that is required to have an operating system.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A gateway for interconnecting wireless and wireline networks, comprising:
   a plurality of micro-engines, each of said micro-engines comprising a memory for storing instructions for performing data flow processing of data packets for a respective stage of a pipeline process for interconnecting said wireless and said wireline networks; and
   a main processor for performing control processing of data packets for said pipeline process;
   wherein only said main processor comprises an operating system and;
   wherein each of the micro-engines associated with a respective stage of the pipeline process performs a table look-up function using a respective data packet header to determine if a data packet is capable of being processed by the respective micro-engines.

2. The gateway of claim 1, further comprising a memory that is shared by the micro-engines and the main processor.

3. The gateway of claim 2, wherein said shared memory comprises a multi-level hierarchy.

4. The gateway of claim 3, wherein said shared memory comprises at least one SDRAM memory bank and at least one SRAM memory bank.

5. The gateway of claim 4, wherein said SRAM memory bank stores at least one of active sessions, data structures and tables.

6. The gateway of claim 4, wherein a Packet Routing Table is stored in said SRAM memory bank.

7. The gateway of claim 4, wherein said SDRAM memory bank stores at least one of packet payload and inactive always-on session overflow from said SRAM memory bank.

8. The gateway of claim 1, wherein the data flow processing of data packets for each stage of the pipeline process is performed by at least one micro-engine.

9. The gateway of claim 1, wherein each micro-engine performs the data flow processing of data packets for at least one stage of the pipeline process.

10. A method of interconnecting wireless and wireline networks, comprising:
    performing data flow processing of data packets for respective stages of a pipeline process for interconnecting said wireless and said wireline networks via respective micro-engines, each of said micro-engines comprising a memory for storing instructions for performing the respective data flow processing; and
    performing control processing of data packets for said pipeline process using a global main processor;
    wherein each of the micro-engines associated with a respective stage of the pipeline process performs a table look-up function using a respective data packet header to determine if a data packet is capable of being processed by the respective micro-engines.

11. The method of claim 10, wherein if a table look-up fails, the respective data packet is forwarded to said main processor for control processing.

12. The method of claim 11, wherein said main processor configures data structures of received data packets for further data flow processing by respective micro-engines of subsequent stages of the pipeline process.

13. The method of claim 10, wherein if a table look-up is successful, the data flow processing of a data packet is performed by at least one respective micro-engine.

14. The method of claim 10, wherein after said global main processor performs the control processing of a received data packet, the processed data packet is forwarded to a queue for further data flow processing by said micro-engines.

15. The method of claim 10, wherein the data flow processing of data packets in various stages of said pipeline process is performed in parallel by respective micro-engines.

16. The method of claim 10, wherein the data flow processing of data packets in each of the stages of the pipeline process is performed by at least one respective micro-engine.

17. The method of claim 10, wherein each of the micro-engines performs the data flow processing of data packets for at least one stage of the pipeline process.

18. The method of claim 10, wherein the data flow processing of a data packet for each of the stages of the pipeline process is performed in the sequential order of the pipeline process by respective micro-engines.

19. An apparatus for interconnecting communication networks, comprising:
- a plurality of micro-engines, each of said micro-engines comprising a memory for storing instructions for performing data flow processing of data packets for a respective stage of a pipeline process for interconnecting said communication networks; and
- a main processor for performing control processing of data packets for said pipeline process;
- wherein only said main processor comprises an operating system and;
- wherein each of the micro-engines associated with a respective stage of the pipeline process performs a table look-up function using a respective data packet header to determine if a data packet is capable of being processed by the respective micro-engines.

* * * * *